Nov. 26, 1935.  C. SCHOCK  2,022,324
TANK VEHICLE FOR TRANSPORTING FLUIDS
Filed Oct. 11, 1933   5 Sheets-Sheet 1
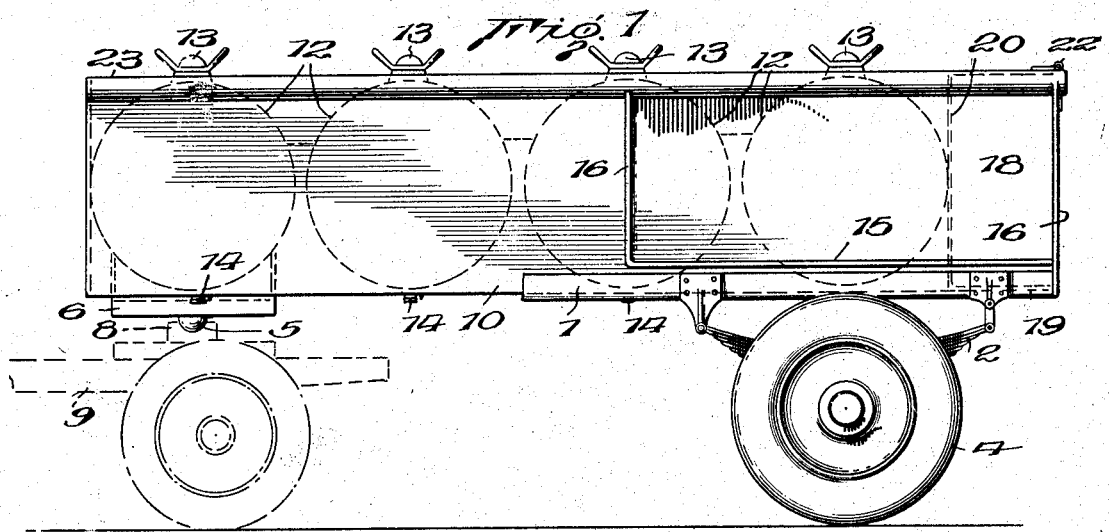
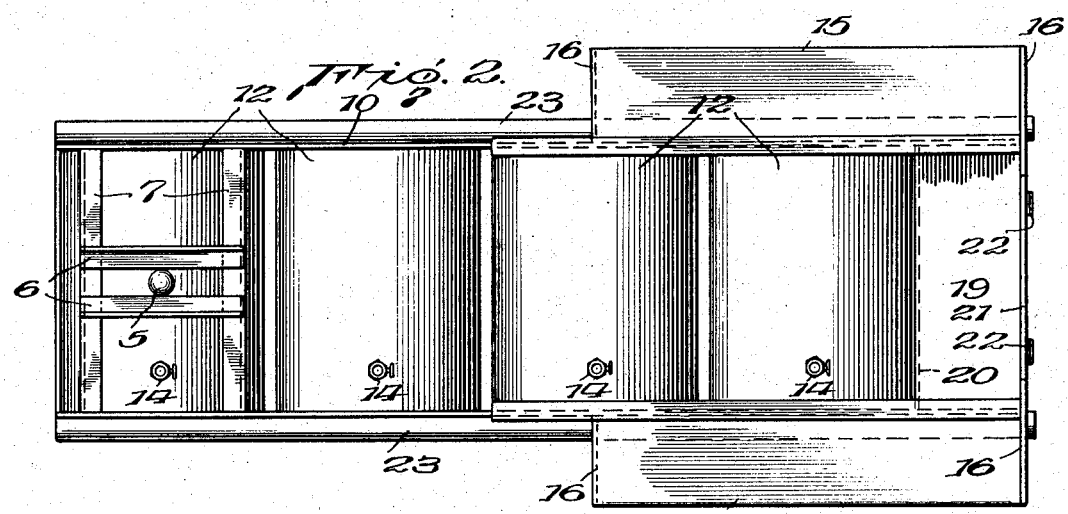
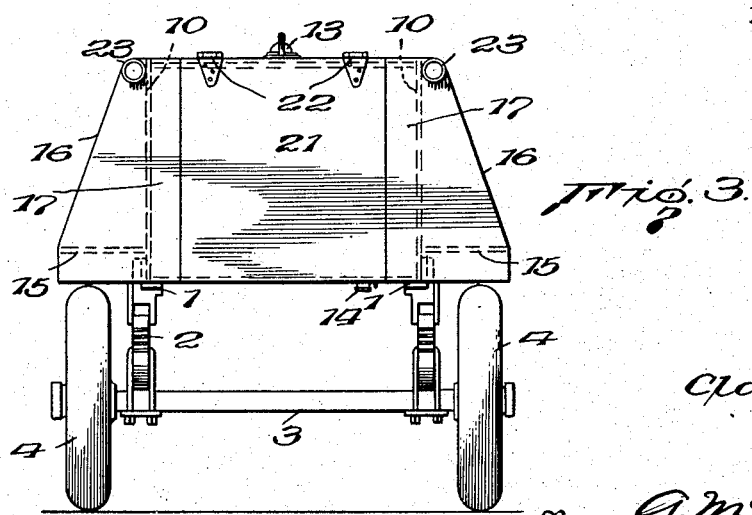
Inventor
Clarence Schock,
By A. M. Houghton
Attorney

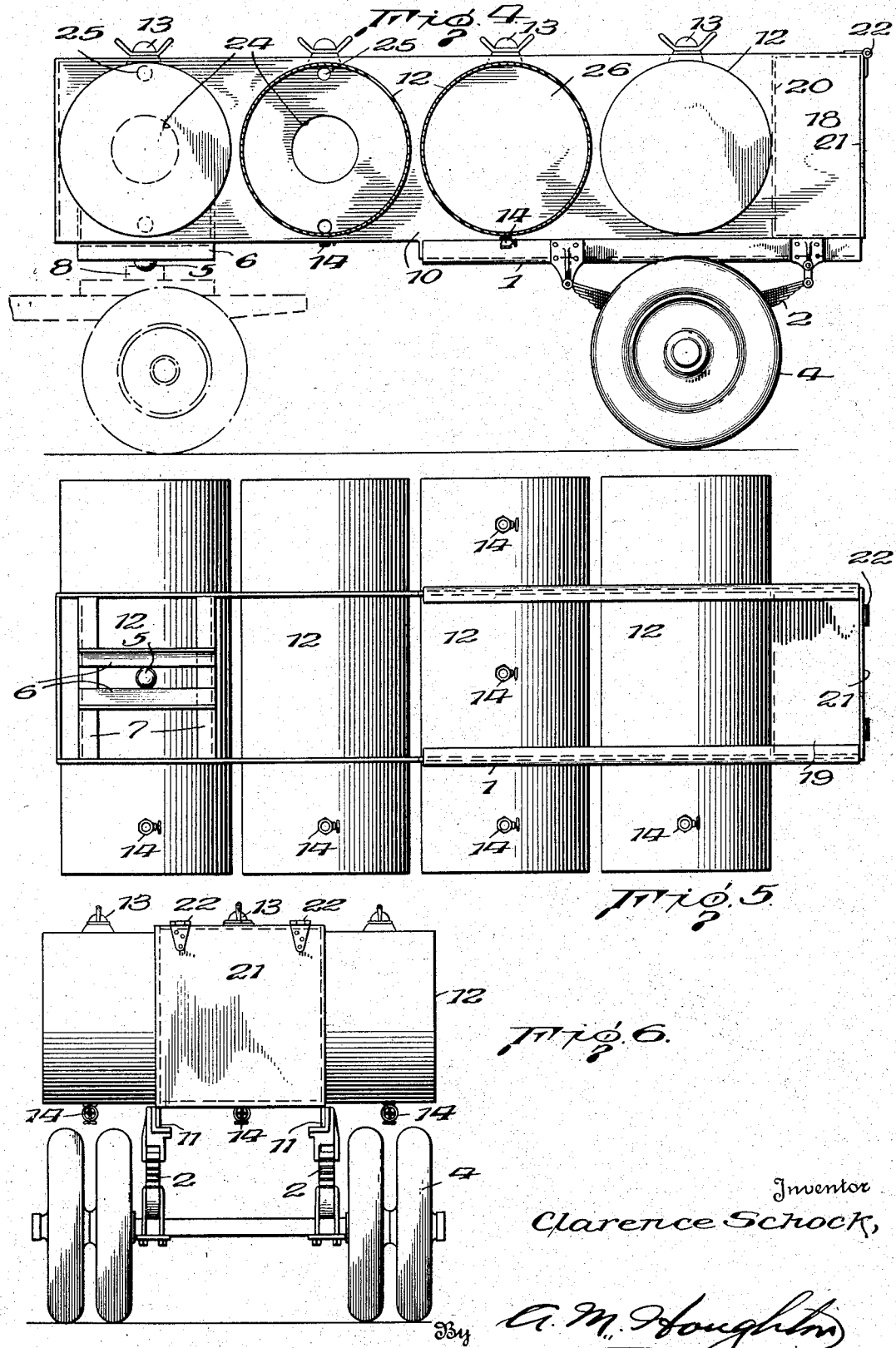

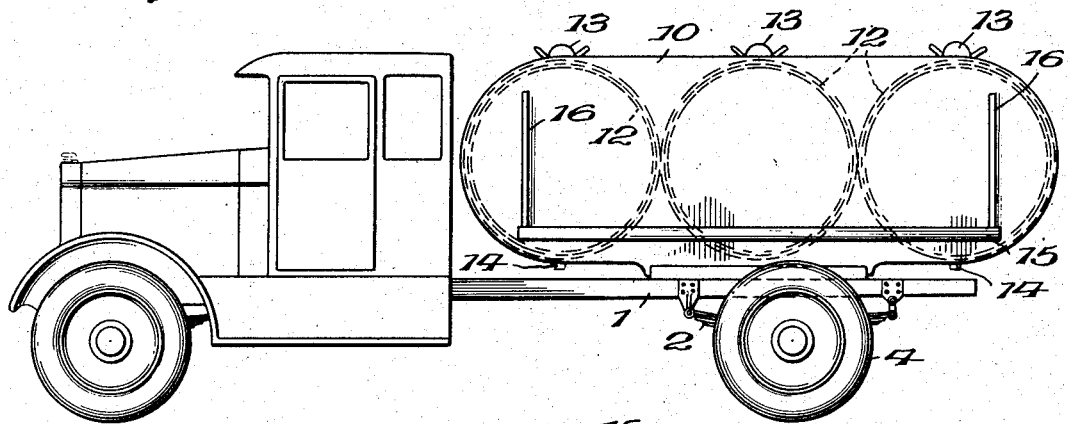
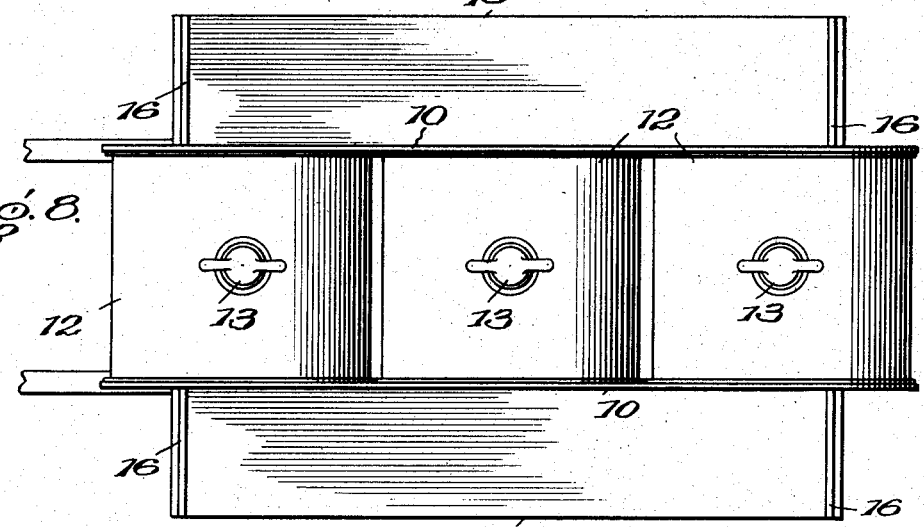
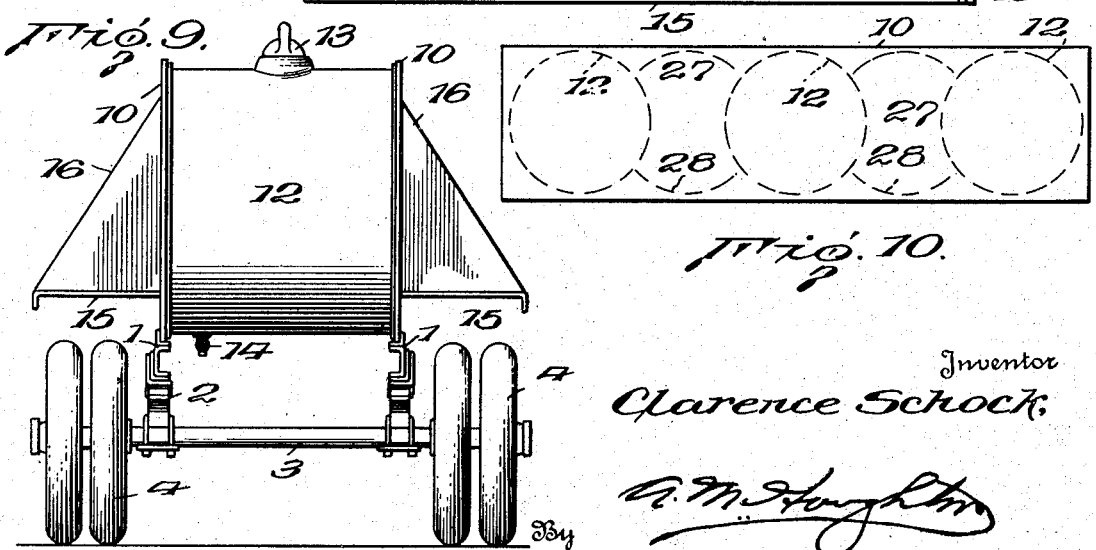

Nov. 26, 1935.  C. SCHOCK  2,022,324
TANK VEHICLE FOR TRANSPORTING FLUIDS
Filed Oct. 11, 1933  5 Sheets-Sheet 4
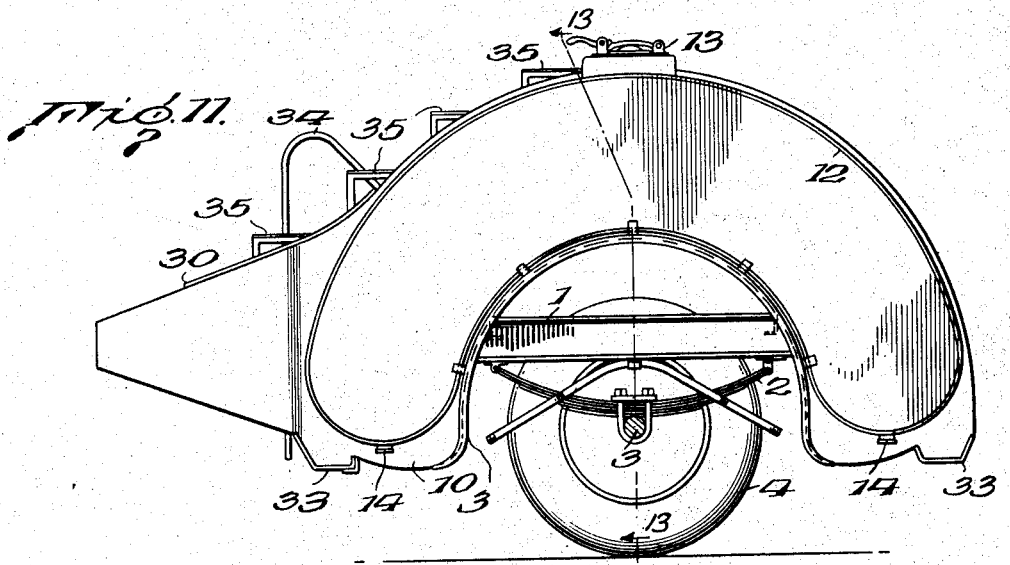
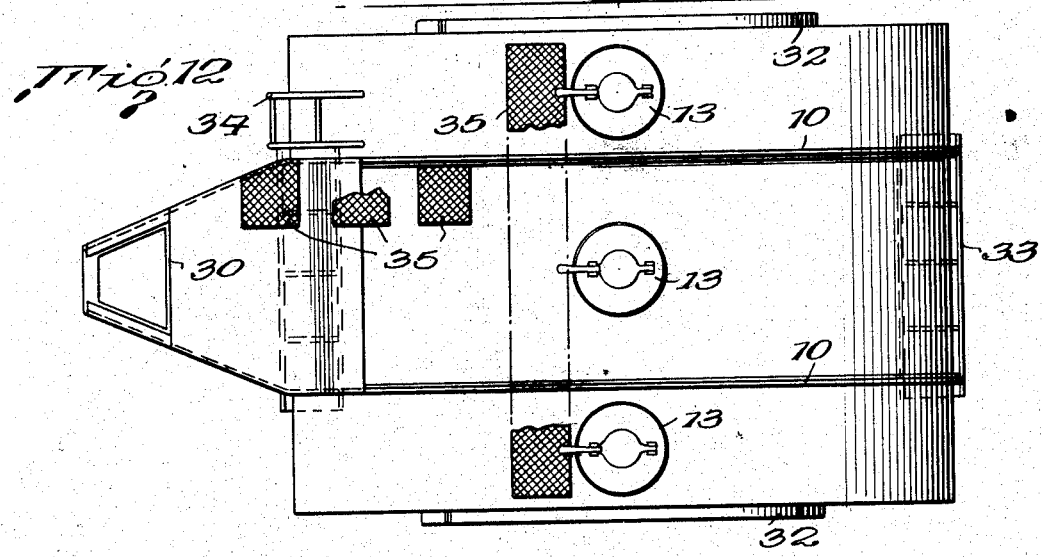
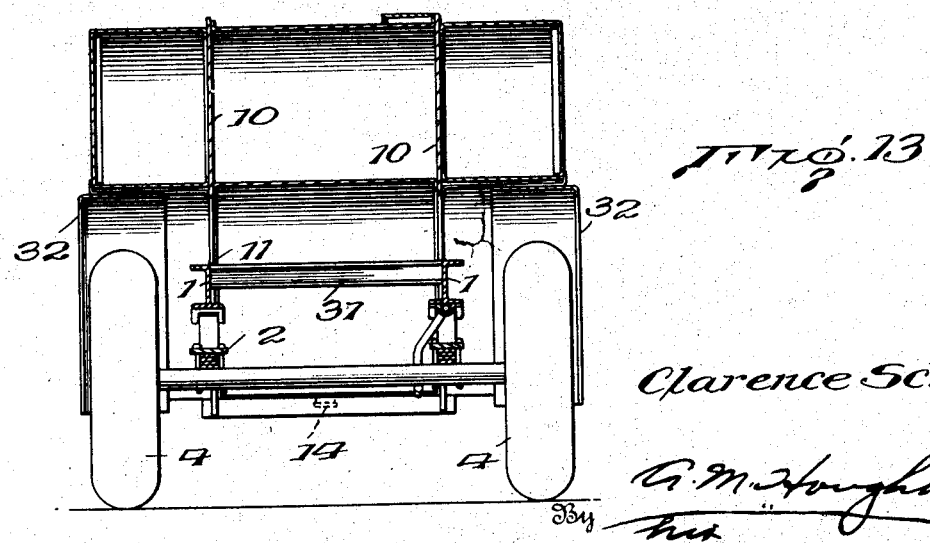
Inventor
Clarence Schock, Nov. 26, 1935.  C. SCHOCK  2,022,324
TANK VEHICLE FOR TRANSPORTING FLUIDS
Filed Oct. 11, 1933  5 Sheets-Sheet 5
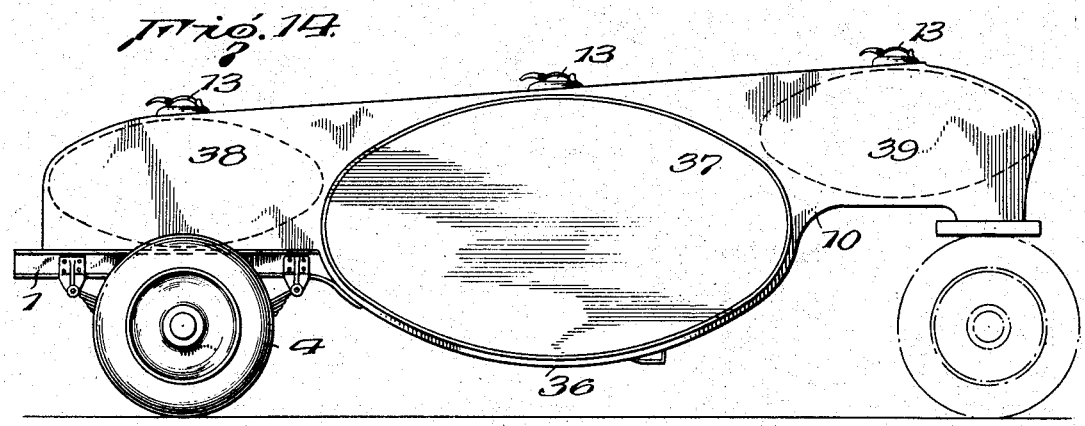
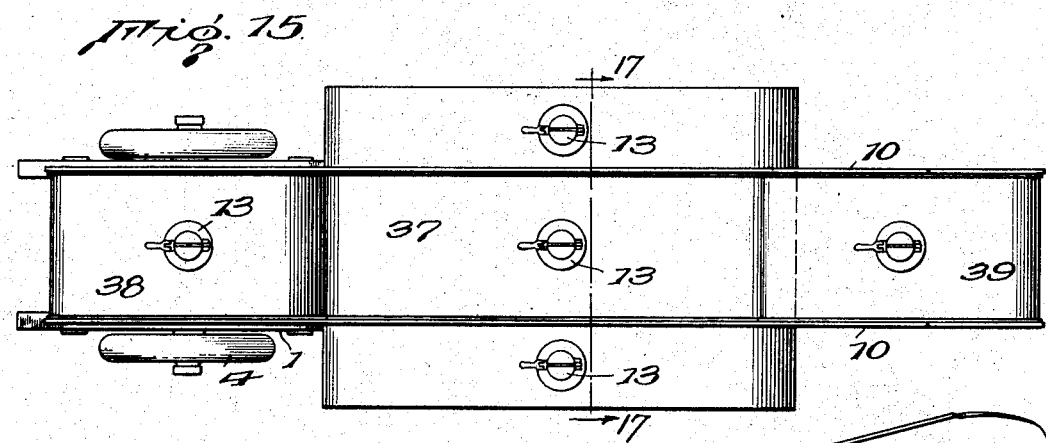
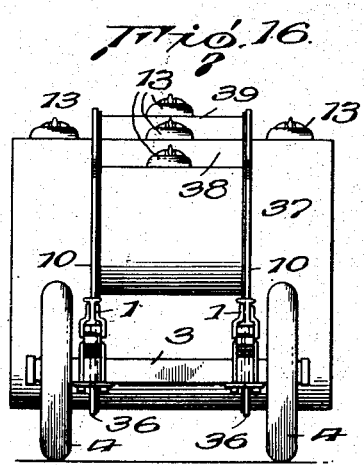
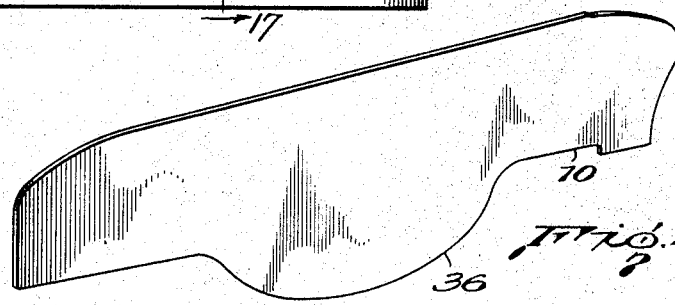
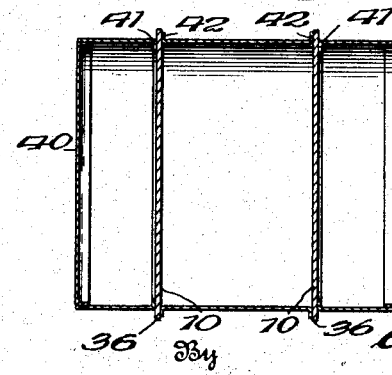
Inventor
Clarence Schock Patented Nov. 26, 1935

2,022,324

UNITED STATES PATENT OFFICE 2,022,324

TANK VEHICLE FOR TRANSPORTING FLUIDS

Clarence Schock, Mount Joy, Pa.

Application October 11, 1933, Serial No. 693,169

12 Claims. (Cl. 280—5)

This invention relates to tank vehicles for transporting fluids; and it comprises such a vehicle having a chassis, walls attached to the chassis and extending upwardly, and a tank or tanks carried transversely of the chassis, the upwardly extending walls of the chassis forming walls of the tank parallel to the length of the chassis; and it further comprises a vehicle having side walls and one or more tanks transversely arranged on the vehicle frame, the side walls of the frame forming end walls or inside walls of the tanks, such inside walls advantageously being provided with openings; and the invention further comprises a tank vehicle carrying a plurality of transversely arranged tanks, one of which, advantageously having a capacity greater than the others, is carried at a relatively low point to lower the center of gravity of the vehicle when loaded; such tank advantageously being divided into a plurality of compartments by vertically extending walls carried by the frame or chassis of the vehicle; all as more fully hereinafter set forth and as claimed.

This application is a continuation in part of my application Serial No. 470,510, filed July 24, 1930.

Among the objects of my invention are: to arrange a series of tanks transversely of a wagon frame, and to securely hold the tanks in spaced relation by means of a relatively few number of parts; the provision of a vehicle in which the weight of the load is partially carried by a pair of plates which either form ends of certain tanks or form partitions extending through their side walls, the plates holding the tanks and forming parts of the chassis frame of the vehicle; the provision of a tank vehicle having such construction that one tank, having a capacity greater than the others if there are more than one, is carried at a relatively low point to lower the center of gravity and to permit the load of the vehicle to be increased without raising the center of gravity of the vehicle; the provision of a vehicle having a tank so constructed as to balance the load over one axle; and the provision of a vehicle simple in construction and inexpensive in manufacture.

Heretofore it has been common practice to form a vehicle of the tank type by arranging a tank on the chassis longitudinally and dividing the tank into compartments by cross-partitions. There are disadvantages inherent in such construction, one of which is that additional beams or like means must be provided to carry the load. Another disadvantage of such construction is that it is impossible to provide a low center of gravity for the tank while preserving its desired shape, unless the tank is so short as to rest in the space between the front and rear carrying wheels. If the tank is of such a length as to extend over the front and rear wheels its shape would have to be altered to provide clearance for the wheels and such alteration would weaken the structure to such an extent as to require the use of more material and additional bracing. It has also been proposed to form the tanks separately and dispose them transversely of a truck frame while holding them in position with removable straps. This form of construction is not designed for permanent tanks within the truck but for carrying gasoline storage drums and is objectionable due to the large amount of material needed in the truck frame and the bracing required, as well as the great weight of the beams necessary to support the tanks.

The above disadvantages are overcome in the present invention by providing a vehicle or trailer, the tanks of which are arranged transversely of the chassis frame and the chassis of which is provided with plates or walls forming end walls or partitions integral with the tanks and at the same time forming bracing and carrying means. The arrangement of the tanks transversely of the chassis permits certain of the large tanks to be carried at a lower point than has been heretofore possible without altering their shape and hence without weakening their construction or causing interference with the wheel action.

In the accompanying drawings showing several forms of a specific embodiment of my invention, Fig. 1 is a side elevation of one form of the invention illustrating the upwardly extending side walls of the chassis forming end walls for a series of transversely arranged tanks and carrying the same;

Fig. 2 is a bottom elevational view showing the chassis bars and side walls and the fifth wheel construction of the trailer assembly;

Fig. 3 is a rear elevation showing a hinged door of a rear compartment and the arrangement of the side walls on the chassis;

Fig. 4 is a side elevation of a modified form of a trailer illustrating the tanks extending outwardly beyond the upwardly extending side walls of the chassis, the side walls of the chassis acting as baffles or partitions dividing each tank into a plurality of compartments and carrying the tanks;

Fig. 5 is a bottom plan view of the same showing the manner in which the tanks extend beyond the side walls;

Fig. 6 is a rear elevation of the above form of invention showing an advantageous construction in which the vertical side walls are welded to the upright portions of the chassis bars as hereinafter described;

Fig. 7 is a side elevation of a further modified form of the invention showing the side walls forming part of the chassis of a truck, the tanks being transversely disposed with respect to the chassis and the side walls forming end walls for the tanks and carrying the same;

Fig. 8 is an enlarged top plan view of the above partly broken away.

Fig. 9 is a rear end elevation on the same scale as Fig. 8 showing the manner of attachment of the side walls and chassis bars to the axle.

Fig. 10 is a diagrammatic view of a slightly different form of the invention showing a construction by which additional tanks may be formed between spaced tanks to conserve space, the side walls of the chassis frame acting as end walls for all the tanks;

Fig. 11 is a side elevation of an additional modification showing one large tank balanced over the axle of a trailer, the shape of the tank conforming in general to the circular periphery of the wheels and the tank extending over the wheels;

Fig. 12 is a top plan view of the modification shown in Fig. 11 illustrating the arrangement by which the trailer is attached to its tractive vehicle and the manner in which the tank is divided into compartments and carried by the side walls;

Fig. 13 is a sectional view taken through line 13—13 of Fig. 11 showing the cross bracing of the chassis bars, the manner in which the side walls are carried and the manner of attachment and disposal of the tank with respect to the side walls;

Fig. 14 is a side elevation of another modification of the invention illustrating a large central tank carried at a relatively low point with respect to the chassis walls and divided into three compartments by the vertically extending chassis walls, the vertical walls of the chassis at the same time forming end walls for two smaller end tanks having their centers of gravity at a higher level than that of the large central tank;

Fig. 15 is a top plan view of the modification shown in Fig. 14;

Fig. 16 is an end elevation of the same showing the relative proportions and positions of the tanks;

Fig. 17 is a section taken on the line 17—17 through the central tank of Fig. 15; and Fig. 18 is a perspective view of one of the metal plates forming the side walls of the chassis in this particular modification.

In the accompanying drawings, in which like reference numerals indicate corresponding parts throughout the several views, reference numeral 1 indicates a pair of bars disposed longitudinally of the chassis advantageously of angular metal construction and supported in the usual manner by leaf springs 2 resting on an axle 3, which in turn is supported by pneumatic wheels 4. A semispherical pivot 5 is carried by a pair of metal angular bars 6, in turn secured to bars 7 of like construction extending between plates 10 and carried thereby. A socket 8 adapted to cooperate with the pivot is carried by the rear end of a truck frame 9; the pivot and socket forming a fifth wheel construction. The above described parts, illustrating a conventional chassis and fifth wheel construction for a trailer, form no part of my invention, and are therefore not further described.

In accordance with the present invention the vertical portions of the chassis side bars have secured thereto vertically extending plates 10 which form a continuation of the vertical portion of the chassis bars. These vertically extending portions may be in the form of metal plates bolted, clamped or welded to the chassis bars, as illustrated best at 11 in Fig. 6, and constitute upwardly extending walls which, as hereinafter explained, serve to hold the tanks to the chassis and act as end walls or partition walls for transversely disposed tanks.

The forward ends of the vertical plates 10 are connected by means of the bars 7 and are supported thereby. In the form of invention illustrated in Figs. 1 to 3, inclusive, a plurality of tanks 12, advantageously formed of sheet metal, are arranged transversely of the chassis, their end walls being formed by the chassis plates 10 to which they are bolted, welded or otherwise secured and by which they are carried. The tanks 12 may each be provided with a removable cap 13 closing filling openings and drain cocks 14 secured to the lower portion of each for emptying.

At the rear end of the vehicle is provided a pair of laterally extending shelves 15 supported at either end by the vertically extending plates 16; the shelves being for the purpose of carrying small containers such as measuring vessels or the like. The rearward plates 16 are inwardly extended as at 17 to form a partial closure for a compartment 18 enclosed by a bottom plate 19, the side walls 10 and end plate 20. A tail gate 21, pivoted to the upper wall of the compartment by means of hinges 22, completes the closure of the compartment and affords ready access to the compartment for storing implements employed in dispensing the liquids carried by the tanks. Extending along the length of each of the plates 10 at its top and secured thereto are tubes 23, which may be employed for housing a filling hose or the like. These tubes are further supported by the vertical side plates 16.

In the modification shown in Figs. 4 to 6, inclusive, the same chassis is employed as in the previously described form. However, in this modification the tanks are longer and have end and inside walls parallel to the chassis dividing each tank into a plurality of compartments or sub-tanks. The inside walls of the tanks are formed by the vertically extending side walls 10 of the chassis and, as shown in Fig. 4, these inside tank walls may be perforated as at 24 and 25 to establish communication between the compartments of the tank. In some instances it is desirable to divide the tank into separate compartments, in which event the inside walls of the tank may be imperforate, as shown at 26 in Fig. 4. The compartments of the tanks having perforate side walls may be filled and drained by single cocks, while the tanks having separate compartments are provided with separate cocks for filling and draining each compartment. It will be observed that this construction results in the formation of a tank transversely arranged with respect to the chassis and having inside walls formed by the side chassis walls of the vehicle and it will be seen that the side walls may at will be perforated to join compartments or left imperforate to form partitions separating the tank into individual compartments, thus fulfilling any particular requirement. The tank vehicle is provided with a rear compartment similar to that described in the previous form.

Figs. 7 to 9, inclusive, illustrate a further modified form of the invention similar to the modification shown in Figs. 1 to 3, wherein the tanks 12 are carried on a standard light truck frame instead of on a trailer frame. As illustrated best in Fig. 8 the side walls of the chassis form end walls for each tank, the side walls being attached to the chassis bars 1 of the truck in the manner shown in Figs. 7 and 9.

In the embodiment of the invention shown by Figs. 7 to 9 inclusive, the side walls 10 which are the carrying means for the tanks are disposed parallel to and extend along the length of the chassis bars 1, but they are secured to the chassis only along a minor portion of their length as illustrated best in Fig. 7. By thus diminishing the area of contact between the walls 10 and the bars 1 there is afforded a construction which results in lessening strain on the welded joints between the tanks and the side walls due to weaving of the chassis frame in travel of the vehicle over rough roads.

In the modification of the invention shown in Fig. 10 the space between the tanks 12 is utilized to form additional tanks 27 by means of arcuately curved plates 28 joining the sides of adjoining tanks. The side plate 10 is similar to that shown in Fig. 1 and performs the same functions. The tanks 27 are made fluid-tight by welding the plates 28 to the adjacent tanks 12.

A modified form of trailer having for its object to make a balanced load on a one-axle vehicle is shown in Figs. 11 to 13, inclusive. In this modification bars 1 are supported in the usual manner by the leaf springs 2 resting on the axle 3 which in turn is supported by the pneumatic wheels 4; in this instance the bars 1 being shorter than in previous modifications and having their centers disposed immediately above the axle. The side walls 10 are secured at 11 to the upright portions of the bars 1 and are so formed as to conform generally in shape to the tanks 12 described hereinafter. The side walls 10 are extended beyond the tanks at the forward part of the vehicle and are inwardly inclined and joined by a hollow truncated member 30 to form a housing adapted to fit over and cooperate with a universal joint and swivel construction carried in the rear of a tractive vehicle, but here not shown. Bars 1 are joined at their ends to angular cross bracing members 31 forming therewith a rectangular frame. The tank 12 is constructed to conform with the circular shape of the periphery of the tires; the upper and lower portions of the shell of the tank being semicircular in cross section and being joined to form an annulus, as shown in Fig. 11. The tank 12 has end and inside walls parallel to the chassis dividing it into three sub-tanks, the inside walls of the tank being formed by the vertically extending side walls 10 as in the preceding modification shown in Figs. 4 to 6, inclusive. The underportions of the tank which extend over the wheels are provided with mud guards 32 and the lowest portions of the side walls 10 before and after the wheels are provided with U-shaped members 33 forming rests under which jacks or blocks may be placed to balance the trailer when it is detached from its tractive vehicle. Ladder 34 and steps 35 form means for gaining access to the filling caps 13.

This form of tank trailer has the advantage of being balanced when fully or partially loaded and of removing any load from the universal joint construction and hence the tractive vehicle. Owing to the large percentage of the total load that is carried at a low point the center of gravity in this particular form of trailer is lower than in any form heretofore constructed. A further advantage is that in spite of the exceedingly low center of gravity of the vehicle the tanks do not interfere with turning of the wheels of the preceding tractive vehicle. This is made possible by extending the side walls to a point considerably in advance of the tanks at which point the trailer is connected to the tractive vehicle. As the load is fully balanced over the single axle this extension of the side walls does not increase the strain on them but does permit ample room to give the rear wheels of the tractive vehicle free play in turning without interfering with the tanks. The manner in which the sub-tanks are joined to the side walls 10 is illustrated best in Fig. 1 and is similar to that described in connection with the modification shown in Figs. 4 to 6, inclusive.

In the modification of the invention shown in Figs. 14 to 18, inclusive, the side plate 10 is extended downwardly in the center below the bars 1 as at 36 to carry a large central tank 37 of oval shape; the plate 10 forming inside walls of the central tank 37 and end walls of two smaller oval end tanks 38 and 39 located respectively before and behind the central tank 37. The oval shape of the tanks 37, 38 and 39 and the disposition of the large central tank 37 at a low central point results in the average center of gravity of the entire vehicle being lowered beyond a point heretofore considered possible. If desired, the portions of the plate 10 forming the inside walls of the tank 37 may be perforated as described in the modification shown in Fig. 4. However, such perforation is not here shown as it has been previously described. The manner in which the vertically extending side walls of the chassis form the inside walls of the tank 37 is shown in Fig. 4. In an actual embodiment of this specific modification the three compartments of the large central tank 37 are constructed to contain 80 per cent of the liquid cargo and the tanks 38 and 39 each contain about 10 per cent of the remaining load. The small proportion of the cargo carried at the elevation of tanks 38 and 39 makes only a negligible increase in the height of the average center of gravity of all the tanks owing to the large percentage carried in the low center tank 37. Each outside portion of the low central tank is formed with a closed end wall 40 and has its inner opening provided with lips 41 formed by inwardly turning a small portion of its entire periphery. The central portion of the tank has each end open and has lips 42 surrounding each opening and similar to lips 41, but outwardly turned. The central portion of the tank is positioned between the chassis walls 10 and lips 42 united thereto by welding or the like. The outside portions of the tank are placed with open ends flush against the outside of opposite side walls 10 and peripheries in registry with that of the central portion and thereafter the lips 41 are welded or otherwise united to the plate.

This construction provides a vehicle adapted to carry a large quantity of liquid and still have a low center of gravity when loaded; the shape and arrangement of the tanks transversely of the chassis further providing maximum capacity combined with maximum structural strength. The central tank is so positioned that any interference with the wheels or other parts of the vehicle is avoided.

The embodiments of the invention shown in Figs. 1 to 9, inclusive, and 14 to 16, inclusive, are advantageous in that the shell of each tank or tubular member is of non-angular cross section and makes a continuous joint with each wall, the main portion of each shell intermediate the walls being spaced from the tanks adjacent to it. This construction results in an assemblage in which the weight of the tanks and their cargo is distributed uniformly to the carrying walls and the shearing stress on the joints is minimized. One form of rectilinear joint between the tank shells and walls is illustrated in Figure 17 wherein flanges 42 are provided to simplify the welding operation.

It is to be understood that the side plates 10 and the various angle arms and tanks connected thereto may be welded in place or otherwise fastened in any desirable way. Likewise changes in shape, size and arrangement of parts may be resorted to without departing from the spirit of the invention or scope of the appended claims.

While I have shown and described this invention particularly as pertaining to trailers, it is not limited to such and is readily applicable to other forms of vehicles such as motor trucks or the like on which tanks are erected or attached.

What I claim is:

1. A vehicle for transporting fluids comprising a chassis, vertically extending walls attached thereto, and a plurality of transversely arranged tanks on the chassis, one tank having end walls and inside walls dividing it into a plurality of compartments, the inside walls for said tank being formed by said vertically extending walls and the end walls of another tank being formed by the said vertically extending walls.

2. A vehicle for transporting fluids comprising a chassis, vertically extending walls attached thereto, a centrally disposed tank carried transversely of the chassis and having inside walls dividing it into a plurality of compartments, end tanks carried transversely of the chassis, the vertically extending walls of the chassis forming the inside walls of the centrally carried tank and the end walls of the end tanks.

3. A vehicle for transporting fluids comprising a chassis, vertically extending walls attached thereto, a centrally disposed tank carried transversely of the chassis and having inside walls dividing it into a plurality of compartments, end tanks carried transversely of the chassis, the vertically extending walls of the chassis forming the inside walls of the centrally carried tank and the end walls of the end tanks, said end tanks having their centers of gravity at a higher level than that of the centrally disposed tank.

4. A vehicle for transporting fluids comprising a chassis, vertically extending walls attached thereto, and a tank having end and inside walls dividing it into a plurality of compartments and carried transversely of the chassis, inside transverse walls of the tank being formed by the vertically extending walls of the chassis and said inside walls provided with openings to establish communication between the compartments of the tank.

5. The combination with a vehicle frame of a series of cylindrical tanks extending transversely thereof, said frame including a side frame member on each end of the tanks for spacing the tanks relative to each other and said side frame members forming end walls for each end of the tanks.

6. The combination with a wheeled frame of a series of cylindrical tanks disposed transversely thereon, said frame including a pair of side frame members having spaced openings, each opening in alignment with the axis of its respective tank, said side frame members being secured to the tank ends for holding the tanks in spaced relation and a tank extension of the same diameter as the first mentioned tanks secured to the opposite sides of each side frame member, whereby the said frame members will form baffle plates within the completed tanks.

7. In combination, a vehicle frame including side walls, a series of tanks arranged transversely of the frame and at least one of said tanks extending beyond the sides thereof, the side walls of the vehicle frame being arranged for holding the tanks in spaced relation and opposite side walls extending into each of said tanks that extends beyond the sides thereof for dividing it into a plurality of separate compartments.

8. A tank vehicle comprising a plurality of tanks and a chassis frame including side walls, said tanks being positioned transversely of the vehicle, and said side walls intersecting said tanks and attached thereto in fluid-tight relation, thereby holding them in spaced relation.

9. A tank vehicle comprising a plurality of cylindrical tanks each disposed transversely of a chassis and means for carrying said tanks, said carrying means comprising a pair of oppositely disposed parallel walls extending vertically along the length of the chassis and being secured to the chassis at a minor portion intermediate the ends of said walls whereby deformation of the walls resulting from like deformation of the chassis is diminished.

10. An improved vehicle for transporting fluids comprising a plurality of hollow members, each of non-angular cross-section and each disposed transversely of a vehicle chassis one before another, and a pair of oppositely disposed vertical walls extending along the length of the vehicle, said walls being integrally joined to said hollow members so as to form closures and carrying means for the same and said walls being secured to said chassis for only a minor portion of their length whereby stress on the joints between said tanks and said walls resulting from deformation of the chassis is diminished.

11. A tank vehicle comprising a plurality of tanks, each of non-angular cross section and each disposed transversely of a chassis one before another, and means for carrying said tanks, said carrying means comprising a pair of oppositely disposed parallel walls extending vertically along the length of the vehicle and being secured to the chassis for only a minor portion of their length whereby deformation of the walls resulting from like deformation of the chassis is diminished, the said walls forming end walls for at least one of said tanks.

12. An improved road vehicle for transporting fluids comprising a pair of longitudinal chassis bars supported by an axle, wheels on said axle, a pair of oppositely disposed, vertical walls extending along the length of the vehicle, said walls being each secured to a different chassis bar for a portion less than the entire length of the wall, a plurality of large tubular members of non-angular cross section disposed transversely with respect to said chassis bars, one before another, said tubular members being integrally joined to each of said walls in such a manner that the shell of each such member makes a continuous joint with each wall thereby to constitute a fluid tank with free space left between it and the adjacent tubular members intermediate said walls.

CLARENCE SCHOCK.